United States Patent
Stephens

(10) Patent No.: US 6,904,931 B2
(45) Date of Patent: Jun. 14, 2005

(54) VACUUM BREAKER WITH WATER LEAK CONTAINMENT DEVICE

(75) Inventor: Anthony Stephens, Marianna, FL (US)

(73) Assignee: Alliance Laundry Systems LLC, Ripon, WI (US)

(*) Notice: Subject to any disclaimer, the term of this patent is extended or adjusted under 35 U.S.C. 154(b) by 0 days.

(21) Appl. No.: 10/315,657

(22) Filed: Dec. 10, 2002

(65) Prior Publication Data
US 2004/0107993 A1 Jun. 10, 2004

(51) Int. Cl.[7] ............................................. F16K 24/02
(52) U.S. Cl. ....................................................... 137/218
(58) Field of Search ................................. 137/217, 218

(56) References Cited

U.S. PATENT DOCUMENTS

| | | | | |
|---|---|---|---|---|
| 2,219,259 A | * | 10/1940 | Horn | 137/217 |
| 2,245,653 A | * | 6/1941 | Dierker | 137/217 |
| 2,284,051 A | * | 5/1942 | Gilbert | 137/217 |
| 2,927,598 A | * | 3/1960 | Thompson | 137/218 |
| 3,180,352 A | * | 4/1965 | Kersten | 137/218 |
| 3,918,477 A | | 11/1975 | Grams | |
| 4,013,088 A | | 3/1977 | Gocke et al. | |
| 4,508,137 A | | 4/1985 | Bolgert | |
| 4,592,382 A | | 6/1986 | Rubin et al. | |
| 5,125,429 A | | 6/1992 | Ackroyd et al. | |
| 5,881,759 A | * | 3/1999 | Andersson | 137/526 |

* cited by examiner

*Primary Examiner*—Gerald A. Michalsky
(74) *Attorney, Agent, or Firm*—Leydig, Voit & Mayer, Ltd.

(57) ABSTRACT

A vacuum breaker having a floating piston that is movable in response to the communication of negative pressure to an inlet port of the vacuum breaker for permitting venting of fluid to the outside atmosphere through a vent opening. The vacuum breaker includes a liquid capture and containment device, which in conjunction with an outer hood, is effective for capturing and containing liquid in a fluid flow stream discharging from the vent opening and redirecting the captured liquid back into the vacuum breaker in order to prevent water leakage.

26 Claims, 4 Drawing Sheets

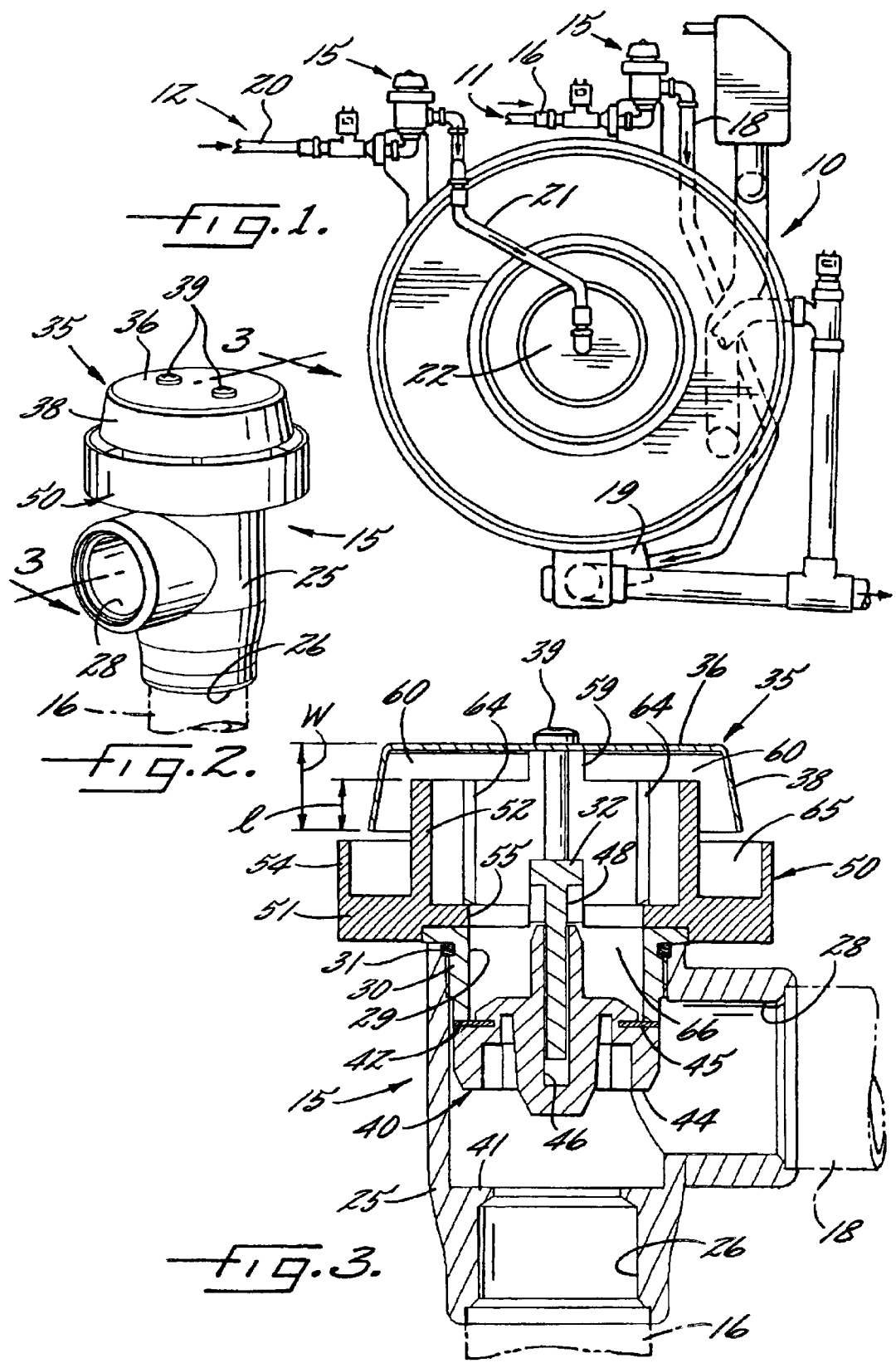

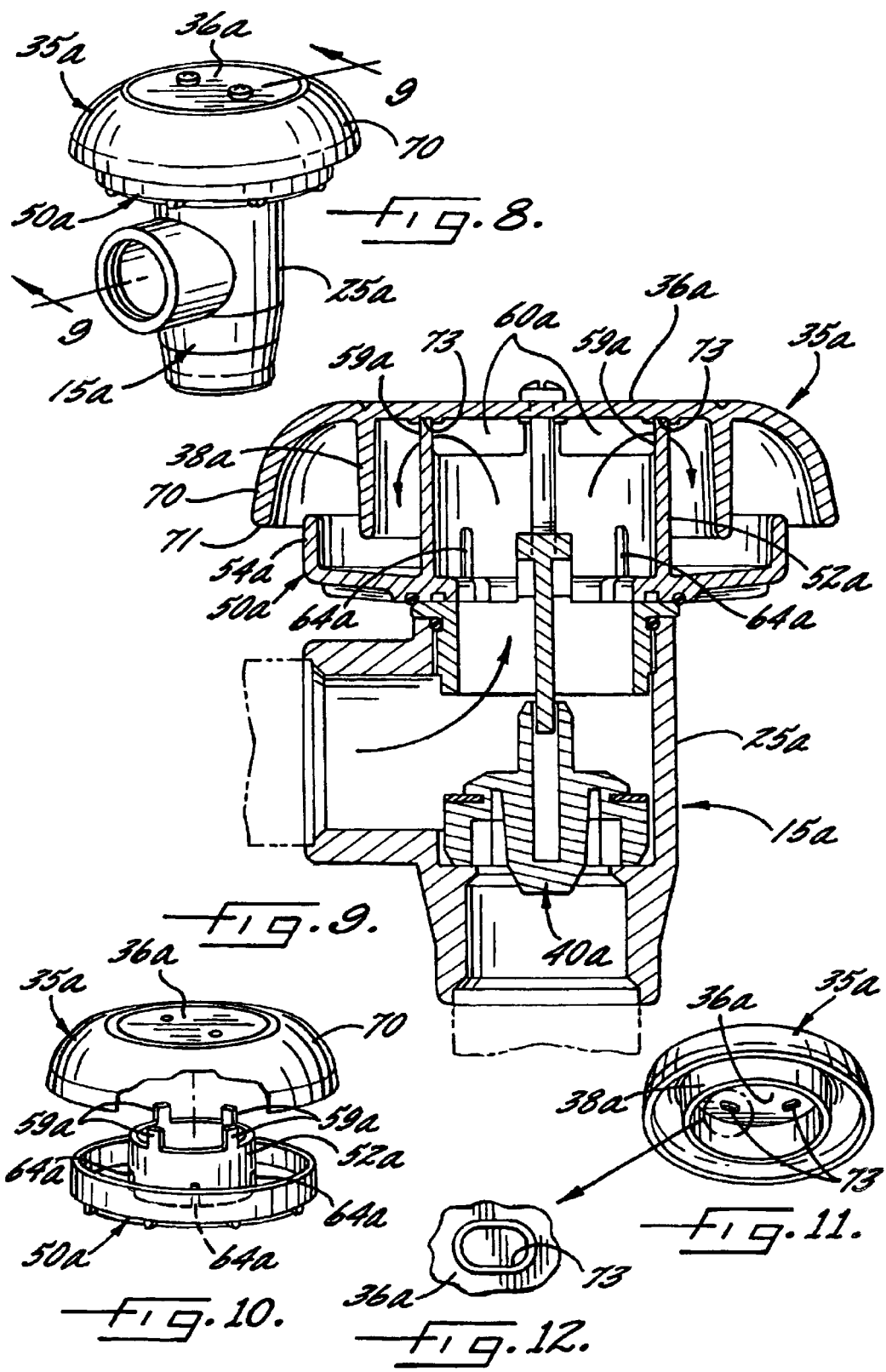

VACUUM BREAKER WITH WATER LEAK CONTAINMENT DEVICE

FIELD OF THE INVENTION

The present invention relates generally to pressure-responsive vacuum breaker valves, and more particularly, to vacuum breaker valves adapted for preventing back flow in liquid supply systems.

BACKGROUND OF THE INVENTION

In fluid supply piping systems, it is known to use atmospheric-type vacuum breaker valves to prevent the backward siphoning of water or other liquid, which may be contaminated, from an outlet of the supply line to the supply source. The problem arises when a drop in pressure in the line on the supply side of the valve creates a partial vacuum in the supply line tending to draw liquid backwards into the supply line.

Vacuum breaker valves typically have a vent which is open to atmosphere when pressurized liquid is not supplied to the valve. When pressurized liquid is supplied to the valve, a valve piston moves to a vent closing position, enabling the liquid to be directed into the discharge piping. When internal pressure within the valve changes rapidly, such as during opening or closing of the valve, pressurized air and liquid within the valve can discharge through the vent opening while the valve piston is in an intermediate position causing undesirable and potentially harmful liquid leakage from the valve to the surrounding equipment.

OBJECTS AND SUMMARY OF THE INVENTION

It is an object of the invention to provide a piston-type vacuum breaker that is relatively simple in construction and adapted for reliable, substantially leak-free operation.

Another object is to provide a vacuum breaker as characterized above which includes a liquid capture and containment device adapted for entrapping and collecting liquid directed through the vent opening due to pressure fluctuations during opening and closing of the valve.

A further object is to provide a vacuum breaker of the foregoing type in which the liquid capture and containment device is effective for directing captured liquid back into the vacuum breaker, for ultimate direction through the liquid outlet port, when the liquid inlet pressure drops and the valve returns to a vent open position.

Yet another object is to provide a vacuum breaker which defines a multiplicity of relatively long air flow passages which deflect and impede the escape of liquid particles in pressurized air flow streams exiting escaping to atmosphere through the vent opening during valve opening and closing.

Still a further object is to provide a vacuum breaker with a liquid capture and containment device of the above kind that is effectively protected from contaminating debris in the outside environment.

Another object is to provide a relatively simple liquid capture and containment device that is adapted for field retrofitting of conventional vacuum breakers.

Other objects and advantages of the invention will become apparent upon reading the following detailed description and upon reference to the drawings, in which:

BRIEF DESCRIPTION OF THE DRAWINGS

FIG. 1 is a front elevational view of an illustrative commercial washing machine having liquid supply piping equipped with vacuum breakers in accordance with the invention;

FIG. 2 is a perspective of one of the vacuum breakers associated with the illustrated washing machine;

FIG. 3 is an enlarged vertical section of the vacuum breaker shown in FIG. 2;

FIG. 8 is a perspective of an alternative embodiment of vacuum breaker in accordance with the invention;

FIG. 9 is an enlarged vertical section of the vacuum breaker shown in FIG. 8 taken in the plane of line 9—9;

FIG. 10 is a exploded perspective of the liquid capture and containment device and the hood of the vacuum breaker shown in FIG. 8;

FIG. 11 is an underside perspective of the hood of the vacuum breaker shown in FIG. 8; and FIG. 12 is an enlarged view of an encircled area on the underside of the hood shown in FIG. 11.

Figure 4:
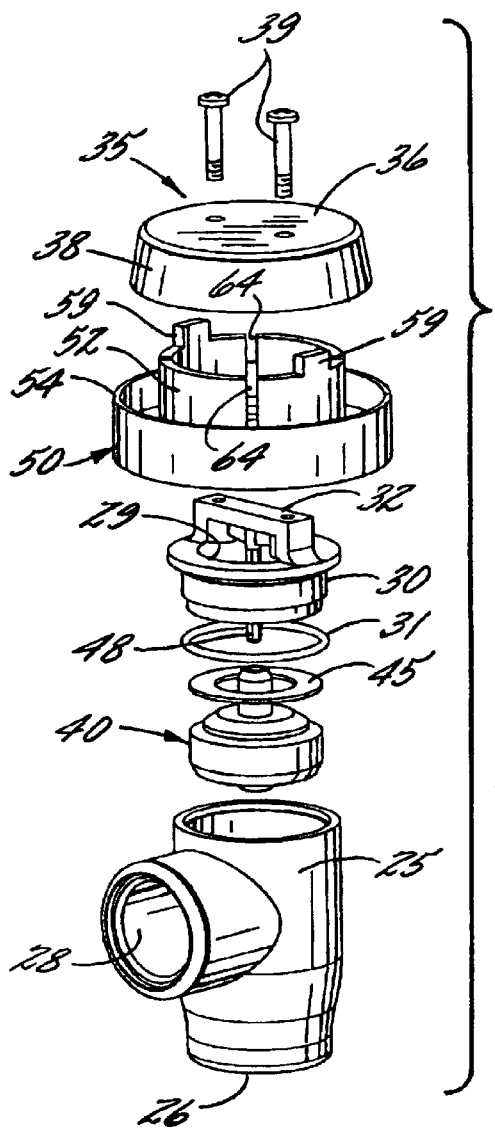
FIG. 4 is an exploded perspective of the illustrative vacuum breaker.
Figure 5:
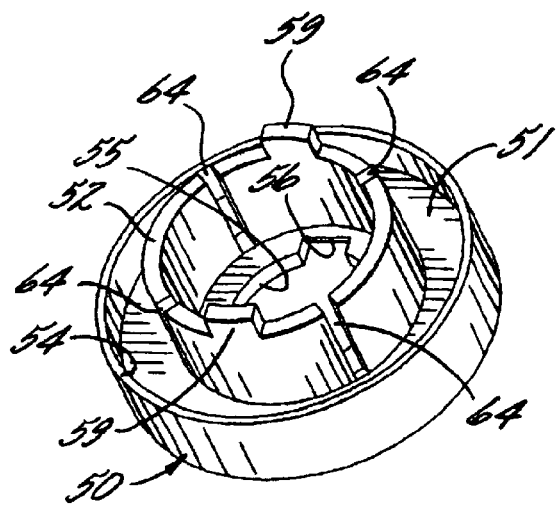
FIG. 5 is an enlarged perspective of a liquid capture and containment device of the illustrated vacuum breaker.
Figure 6:
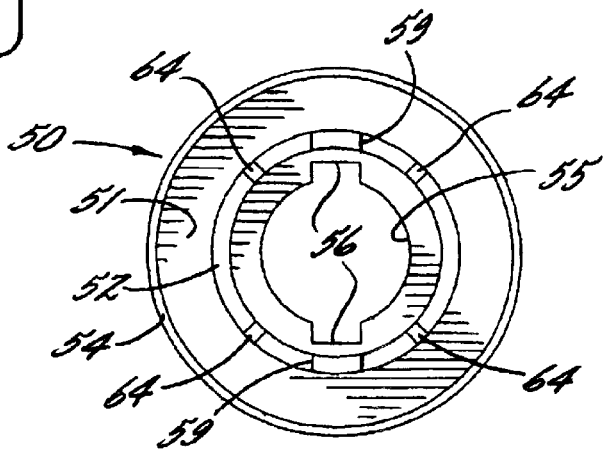
FIG. 6 is a top plan view of the liquid capture and containment device shown in FIG. 5.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to FIG. 1 of the drawings, there is shown an illustrative commercial laundry machine 10 having liquid supply piping systems 11, 12 each equipped with a vacuum breaker 15 in accordance with the invention. The liquid piping system 11 includes a water supply line 16 which is connected to a liquid inlet of the vacuum breaker 15 and a discharge line 18 connected between the vacuum breaker 15 and a sump 19 on the underside of the washing machine 10 for directing washing water to the machine for use during a washing cycle. The piping system 12 includes a water supply line 20 connected to a liquid inlet of a similar vacuum breaker 15 and a discharge line 21 which connects axially with a front door 22 of the washing machine 10 for directing rinse water during the course of a washing cycle. Since the vacuum breakers 15 are identical in construction, only one need be described in detail.

The illustrated vacuum breaker 15 has a housing 25 which defines a liquid inlet port 26 on the underside for connection to a liquid supply line 16, a liquid outlet port 28 at a right angle thereto for connection with a discharge line 18, and a vent opening 29 above and in axial alignment with the liquid inlet port 26, The vent opening 29 in this instance is defined by an annular insert 30 threaded into engagement with an upper end of the valve body 25. An O-ring seal 31 is provided between the body 25 and the insert 30 adjacent the downstream end. The insert 30 in this case has an integrally formed diametrically extending bridge 32 extending over the top of the insert 30 upon which a downwardly directed cup-shaped hood 35 is mounted. The illustrated hood 35 has a substantially flat upper wall 36 and a downwardly and outwardly tapered frustoconical sidewall 38 and is secured to the bridge 32 by means of fastening screws 39 extending into the bridge 32.

For closing the liquid inlet port 26 and venting the vacuum breaker 15 to atmosphere responsive to vacuum pressures in a liquid supply line 16 to the vacuum breaker 15, a floating valve piston 40 is provided for vertical movement between a liquid inlet seat 41 defined in the housing 25 about the liquid inlet port 26 and a vent opening seat 42 defined by a lower end of the annular insert 30 about the vent opening 29. The valve piston 40 in this case has an annular construction with a lower annular seating end 44 adapted, for engagement with the liquid inlet seat 41 and an annular radial seating pad 45 on the upper side of the piston 40 adapted for engagement with the vent opening seat 42. For guiding axial movement of the floating piston 40 between the seats 41, 42, the piston 40 is formed with an axial bore 46 that is guided for relative movement on an axial pin 48 depending from the underside of the cross bridge 32 of the vent opening insert 30.

Figure 7A:
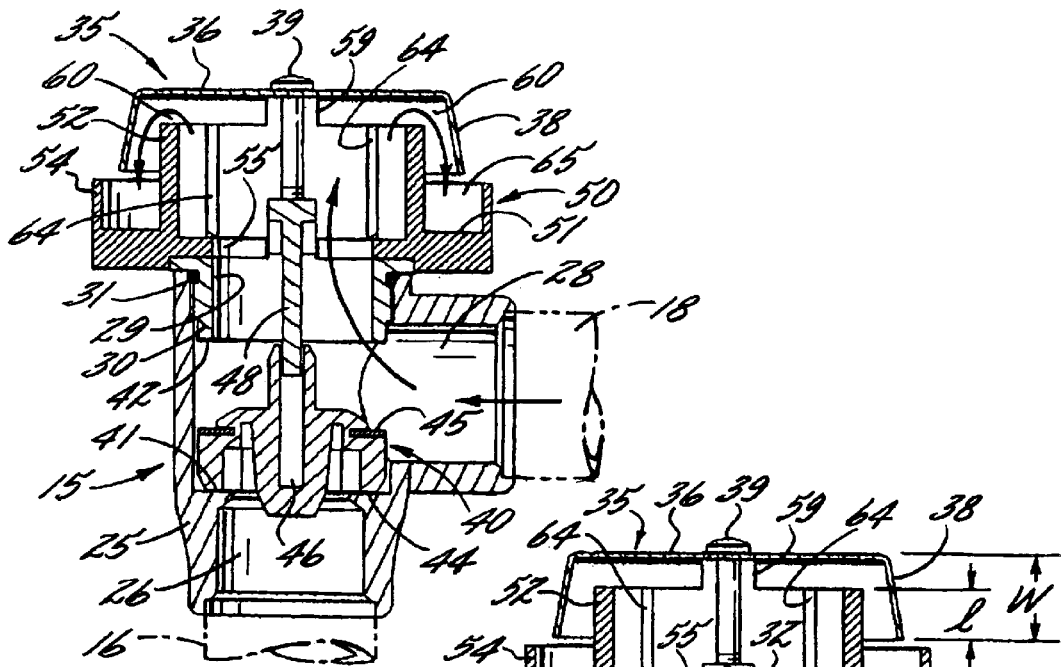
FIG. 7A is a vertical section of the illustrated vacuum breaker with a valve piston thereof in a vent open position.
Figure 7B:
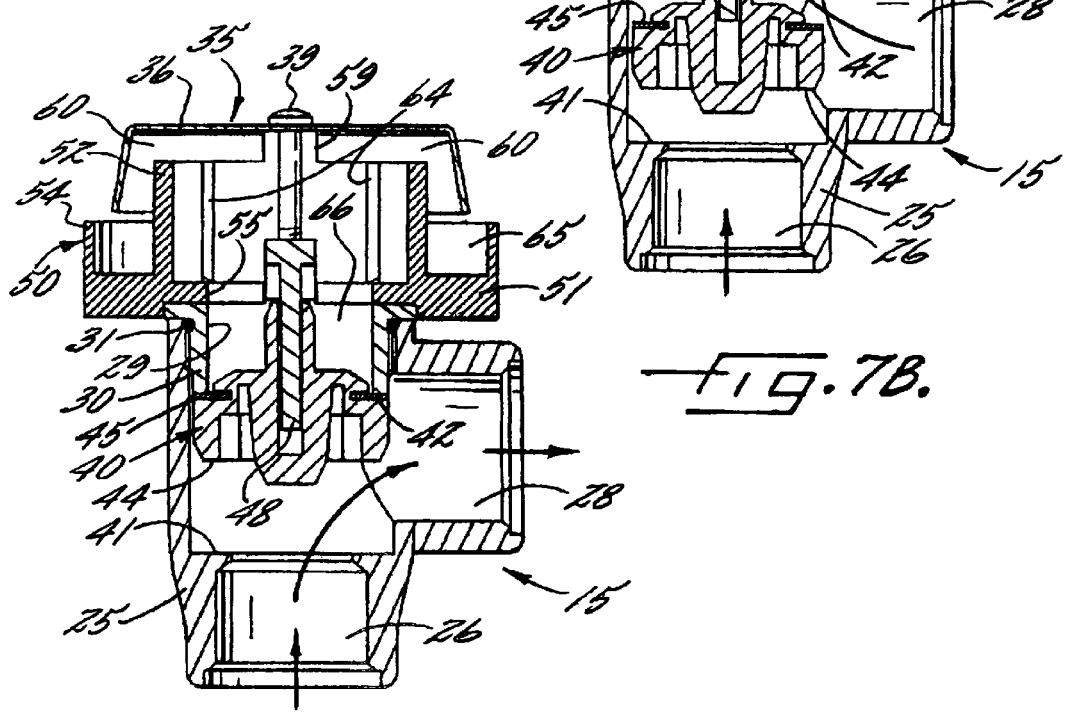
FIG. 7B is a vertical section of the vacuum breaker, similar to FIG. 7A, showing the valve piston in an intermediate position during movement between vent opening and closing positions.
Figure 7C:
FIG. 7C is a vertical section of the vacuum breaker, similar to FIGS. 7A and 7B, showing the valve piston in a vent closing position with pressurized liquid being directed between a valve inlet and outlet.

With reference to FIG. 7A, the piston 40 is shown in its lower position on the liquid inlet seat 41, such as prior to the introduction of pressurized liquid, or during conditions in which a partial vacuum is generated within the liquid supply piping 16. In this condition, the outlet port 28 communicates freely with atmosphere via the vent opening 29 and the piston 40 prevents liquid from being drawn into the inlet port 26 and from the discharge line 18 due to vacuum conditions that might occur in the liquid supply line 16. When pressurized liquid is directed through the vacuum breaker 15, as depicted in FIG. 7C, the piston 40 is forced by the liquid pressure against the vent opening seat 42, sealing the vacuum breaker 15 from the outside atmosphere and enabling liquid to travel through the vacuum breaker and discharge port 28.

During the initial supply of pressurized liquid to the vacuum breaker 15, or during the initial communication of a vacuum to the inlet port 26, as is known in the art, the piston 40 will move between its opposed seats 41, 42. In the intermediate position, as depicted in FIG. 7B, there is no seal between the liquid inlet port 26 and the vent opening 29, such that during abrupt pressure changes that can occur with such piston movement, a pressurized air stream carrying liquid particles can be forcefully directed about the piston 40 and out the vent opening 29. Heretofore in conventional vacuum breakers, as indicated above, such outward venting to atmosphere can cause liquid carried by the venting air stream to leak from the vacuum breaker and cause harm to the surrounding area and the equipment with which the vacuum breaker is used.

In accordance with the invention, the subject vacuum breaker includes a liquid capture and containment device which impedes, captures and contains liquid carried in air streams venting to the atmosphere so as to prevent leakage of liquid from the vacuum breaker. To this end, in the illustrated embodiment, the vacuum breaker 15 has a liquid capture and containment device 50 disposed about the vent opening 29 in underlying relation to the hood 35. The liquid capture and containment device 50 in this case is mounted in interposed relation between the upper end of the opening insert 30 and the underside of the hood 35.

The illustrated liquid capture and containment device 50 comprises an annular disk-shaped base 51 and inner and outer, concentric, cylindrical walls 52, 54 extending upwardly from the base 51. The base 51 has a central opening 55 which coincides with and defines an extension of the vent opening 29 and is formed with a recess or counterbore 56 on its underside that centers the liquid capture and containment device on the insert 30 The inner cylindrical wall 52 is disposed radially of the vent opening 29, and the outer cylindrical wall 54 is located about the outer periphery of the base 51.

In carrying out the invention, the liquid capture and containment device 50 and the hood 35 define a plurality of relatively long, circuitous air passageways designed to impede the movement of and remove liquid particles from pressurized air flow streams venting from the vacuum breaker 15. The inner cylindrical sidewall 52 in this case extends upwardly a substantially greater distance than the outer cylindrical sidewall 54 and is provided with small outwardly extending rib-like segments 59 which define a pair of relatively narrow, substantially semicircular, fluid passageways 60 communicating radially outwardly from the end of the inner cylindrical sidewall 52. End faces of the inner cylindrical sidewall 52 which define the radial fluid passages 60 are located substantially within the underside of the hood 35, and preferably a distance "l" above the lower peripheral edge of the hood which is at least one-half the axial depth "w" of the hood. Hence, the hood 35 substantially overlaps the end of the inner cylindrical sidewall 52 such that pressurized air exiting through the vent openings 60 must travel a substantial axial distance along the inner cylindrical sidewall 52, impinge the underside of the hood 35, turn radially outwardly 90°, and then reverse directions under the guidance of the downwardly directed hood sidewall 38. The length and circuity of the air flow path substantially impedes movement of liquid particles and removes liquid particles from the venting air flow stream.

In further keeping with the invention, the inner cylindrical sidewall 52 also is formed with a plurality of circumferentially spaced axial slit-like openings 64 which extend from the base 51 through the upper end of the inner cylindrical sidewall 52. Such axial slits 64 define further circuitous air passageways for air and moisture venting from the vacuum breaker 15 which impede travel and remove liquid particles from the exiting air flow stream.

In carrying out a further important aspect of the invention, the liquid capture and containment device defines a liquid containment chamber for receiving and containing liquid removed from exiting air streams as they are vented from the vacuum breaker. The base 51, together with the inner and outer sidewalls 52, 54 define a first annular chamber 65 disposed directly under the lower end of the hood sidewall 38. The lower terminal end of the hood sidewall is concentrically disposed immediately above the annular chamber 65 at a radial location between the cylindrical sidewalls 52, 54, and preferably, at a radial location about midway between the sidewalls 52, 54. It will further be appreciated that when the piston is in its vent closing position, as depicted in FIG. 7C, the inner cylindrical sidewall 52, the base 51, and the upper side of the piston 40 define an inner liquid receiving and containment chamber 66 directly under a central portion of the hood 35.

It will be seen and understood by persons skilled in the art that during periods in which the valve piston 40 is moved between the liquid inlet and vent opening seats 41, 42, whether it be during the initial supply of pressurized liquid to the inlet port 26 or in response to vacuum pressures in the supply line 16, any liquid particles that may be carried about the piston 40 with a venting air flow stream will incur a circuitous, relatively long route of travel through or about the liquid capture and containment device 50 under the guidance of the hood 35, causing the liquid particles to separate from the liquid flow stream. As the liquid particles are removed from the air flow stream, they will drop into the containment chambers 65, 66 defined by the liquid capture and containment device 50. If during this period the valve piston is moved to its vent closing position, as depicted in FIG. 7C, liquid will remain contained within the device 50. Upon termination of pressurized liquid through the vacuum breaker and return of the valve piston to its vent opening position (FIG. 7A), it will be seen that liquid within the containment device 50 will drain into the vacuum breaker, with liquid from the outer annular containment chamber 65 flowing through the slit openings 64. Hence, the liquid capture and containment device 50 captures and contains liquid that normally would be discharging to the atmosphere and causing undesirable leakage to the surrounding areas and to the equipment upon which the vacuum breaker is used. It further will be appreciated that the liquid capture and containment device 50 may be used for field retrofitting of conventional vacuum breakers. Alternatively, the liquid capture and containment device 50 could be formed as an integral part of the vacuum breaker housing 25.

Referring now to FIGS. 8–12, there is shown an alternative embodiment of vacuum breaker 15a in accordance with the invention, wherein items similar to those described above have been given similar reference numerals with the distinguishing suffix "a" added. The vacuum breaker 15a has a housing 25a, a piston 40a, and a liquid capture and containment device 50a substantially similar to that described above. The vacuum breaker 15a further includes a hood 35a, which like the hood previously described includes an upper wall 36a and a downwardly directed annular sidewall 38a disposed at a radial location intermediate cylindrical walls 52a, 54a of the liquid capture and containment device 50a. The hood sidewall 38a in this case extends in substantially perpendicular relation to the base 36a.

In keeping with this embodiment of the invention, the hood 35a includes a further depending sidewall 70 disposed radially outwardly of the sidewall 38a of the hood 35a and the outer sidewall 54a of the liquid capture and containment device 50a for preventing contaminating debris in the outside environment from falling or being directed into the liquid capture and containment device 50a and vacuum breaker 15a. The outer sidewall 70 in this case has an outwardly and downwardly curved configuration with a lower terminal edge 71 disposed slightly below the upper terminal edge of the liquid capture and containment device sidewall 54a. It will be seen that the vacuum breaker 15a will function similar to the previously described vacuum breaker in capturing and containing liquid discharging from the vacuum breaker when the piston 40a is moved between its opposite shutoff positions. The outer sidewall 70 of the vacuum breaker 15a, however, in this case both increases the circuitous path of the discharging air and liquid while at the same time provides a protective cover over the entire upper perimeter of the liquid capture and containment device 50a for preventing entry of contaminants and debris.

To facilitate concentric mounting of the hood 35a on the hood capture and containment device 50a, the cylindrical sidewall 52a of the liquid capture and containment device 50a in this case has a plurality of circumferentially spaced upstanding rib segments 59a which are received within respective pockets 73 formed in the underside of the hood. The vertical drainage slots 64a in the sidewall 52a of the liquid capture and containment device 50a in this instance extend upwardly only about one-half the height of the sidewall 50a.

From the foregoing, it can be seen that the vacuum breaker of the present invention is adapted for reliable, substantially leak free operation. The liquid capture and containment device of the vacuum breaker is effective for both capturing liquid traveling in pressurized air streams venting from the vacuum breaker and redirecting the captured liquid back into the vacuum breaker. The vacuum breaker further has a relatively simple construction which lends itself to economical manufacture and field retrofitting.

What is claimed:

1. A vacuum breaker comprising:
   a housing having an inlet port for connection to a liquid supply line and an outlet port for connection to a liquid discharge line,
   said housing having an air vent opening for communication with the outside atmosphere,
   a piston movable within an interior said housing between a first position closing said air vent opening and a second position closing said inlet port,
   said piston being responsive to fluid pressure at said inlet port for moving to said first position,
   said piston being responsive to a drop in fluid pressure at said inlet port for movement to said second position,
   a deflector hood supported on said housing outwardly of said vent,
   a liquid capture and containment device defining a chamber disposed beneath said hood for capturing and containing liquid particles in a fluid stream discharging from said air vent opening, and said chamber being in fluid communication with the interior of said housing when said piston is moved to said second position for draining liquid captured and contained in said chamber to the interior of said housing.

2. The vacuum breaker of claim 1 in which said liquid capture and containment device Is located adjacent said vent opening.

3. The vacuum breaker of claim 1 in which said liquid capture and containment device is located in surrounding relation to said vent opening.

4. The vacuum breaker of claim 1 in which said liquid capture and containment device includes a base with an upstanding sidewall which define a chamber for receiving and collecting liquid separated from a fluid stream discharging from said vent opening.

5. The vacuum breaker of claim 4 in which said base has an aperture aligned with a vent opening through which a fluid stream discharging through said vent opening passes.

6. The vacuum breaker of claim 4 in which said hood has a downwardly opening cup-shape with an outer sidewall extending around and over the sidewall of said liquid capture and containment device.

7. The vacuum breaker of claim 6 in which said hood has a sidewall that extends in an axial direction downwardly a distance "w," and said liquid capture and containment device sidewall extends upwardly beyond a lower perimeter of said hood sidewall a distance at least one-half "w".

8. The vacuum breaker of claim 4 in which said liquid capture and containment device includes a second upstanding sidewall in surrounding relation to said vent opening in inwardly disposed relation to said first sidewall for directing a fluid stream discharging from said vent opening in an axial direction for impingement with an underside of said hood.

9. The vacuum breaker of claim 8 in which said hood has a downwardly directed sidewall for reversing the direction of fluid directed against the underside of the hood by mid liquid capture and containment device second sidewall.

10. The vacuum breaker of claim 8 in which said second sidewall includes a plurality of axial openings which define alternative fluid passageways for fluid discharging from said vent opening.

11. The vacuum breaker of claim 8 in which said first and second sidewalls define a fist annular chamber for receiving liquid particles separated from a fluid stream discharging from said vent opening and said second sidewall and an upper side of said piston define a second chamber for receiving liquid particles separated from a fluid stream discharging from said vent opening when said piston is in said first position, and said second sidewall being formed with openings for permitting draining of liquid contained within said first chamber into said vacuum breaker housing when said piston is moved to said second position.

12. The vacuum breaker of claim 8 in which said second annular sidewall has opposed upstanding ribs upon which said hood is mounted such that the underside of the hood and the axial end of said second sidewall define a plurality of radially fluid passageways for directing a fluid stream discharging from said vent opening in an outward radial direction.

13. The vacuum breaker of claim 1 in which said liquid capture and containment device includes a first annular upstanding sidewall about a perimeter thereof and a second annular upstanding sidewall disposed radially inwardly of said first sidewall, said first and second sidewalls defining a first liquid containment chamber, said second sidewall and an upper side of said piston defining a second liquid containment chamber when said piston is in said first position, and said chambers both being in fluid communication with the interior of said housing when said piston is in said second position for draining liquid from said first and second chambers to the interior of said housing when said piston is moved to said second position.

14. The vacuum breaker of claim 13 in which said second annular sidewall extends upwardly a distance greater than said first annular sidewall.

15. The vacuum breaker of claim 13 in which said hood has a downwardly directed annular sidewall with a lower perimeter disposed at a radial location between said first and second sidewalls of said liquid capture and containment device.

16. The vacuum breaker of claim 13 in which said hood has a downwardly directed annular sidewall with a lower perimeter disposed at a radial location outwardly of said first and second sidewall of said liquid capture and containment device.

17. The vacuum breaker of claim 13 in which said second annular sidewall has an opening communicating between said first and second chambers, and said second chamber communicates directly with the interior of said housing when said piston is in said second position.

18. The vacuum breaker of claim 1 in which said liquid inlet port and said vent openings are in axial alignment in said housing, and said liquid discharge port communicates at a right angle to the axis of said liquid inlet port and vent opening.

19. A vacuum breaker comprising:
a housing having an inlet port for connection to a liquid supply line and an outlet port for connection to a liquid discharge line,
said housing having an air vent opening for communication with the outside atmosphere,
a piston movable within said housing between a first position closing said air vent opening and a second position closing said inlet port,
said piston being responsive to fluid pressure at said inlet port for moving to said first position,
said piston being responsive to a drop in fluid pressure at said inlet port for movement to said second position,
a deflector hood supported on said housing outwardly of said vent,
a liquid capture and containment device disposed about said vent opening in underlying relation to said hood for directing a fluid stream from said vent opening against an underside of said hood and for collecting and containing liquid separated from the fluid stream prior to discharge to atmosphere,
said liquid capture and containment device including first and second upstanding annular sidewalls in radially spaced relation to each other,
said hood having a downwardly directed annular sidewall with a lower perimeter disposed at a radial location between said first and second sidewalls of said liquid capture and containing device, and
said hood having a second downwardly directed annular sidewall with a lower perimeter disposed at a radial location outwardly of said first and second sidewalls of said liquid capture and containment device.

20. The vacuum breaker of claim 19 in which said liquid capture and containment device includes a base, said first upstanding annular sidewall being supported by said base in surrounding relation to said vent opening for channeling a fluid flow stream discharging from said vent opening in an axial direction into impingement with a central underside location of said hood.

21. The vacuum breaker of claim 20 in which at least a portion of an axial end of said first annular sidewall and hood define at least one radial passage for redirecting a discharging fluid stream from said vent opening in an outward radial direction.

22. The vacuum breaker of claim 21 in which said first annular sidewall is formed with a plurality of radially spaced openings for defining alternative fluid flow passageways for fluid discharging from said vent opening.

23. The vacuum breaker of claim 20 in which said first annular sidewall extends in an upward axial direction a greater distance than said second annular sidewall.

24. The vacuum breaker of claim 19 in which said first and second sidewalls of said liquid capture and containment device define a first liquid containment chamber, and said second sidewall of said liquid capture and containment device and an upper side of said piston define a second liquid containment chamber when said piston is in said first position.

25. A laundry machine comprising a housing within which items are contained for laundering, a liquid supply piping system including a vacuum breaker having a water inlet port and a water outlet port, a liquid supply line connected to said inlet port for supplying water to said vacuum breaker, a discharge line connected to said outlet port for directing water from said vacuum breaker to said laundry machine housing for use during a working cycle, said vacuum breaker housing having an air vent opening for communication with the outside atmosphere, a piston movable within an interior or said vacuum breaker housing between a first position closing said air vent opening and a second position closing said inlet port, said piston being responsive to fluid pressure at said inlet port for moving to said first position, said piston being responsive to a drop in fluid pressure at said inlet port for movement to second position, a deflector hood supported on said housing outwardly of said vent, and a liquid capture and containment device disposed beneath said hood defining a chamber for capturing and containing liquid particles in a fluid stream discharging from said air vent opening, said chamber being in fluid communication with the interior of said vacuum breaker housing when said piston is moved to said second position for draining liquid captured and contained in said chamber to the interior of said vacuum breaker housing.

26. A laundry machine comprising a housing within which items are contained for laundering, a liquid supply piping system including a vacuum breaker having a water inlet port and a water outlet port, a liquid supply line connected to said inlet port for supplying water to said vacuum breaker, a discharge line connected to said outlet port for directing water from said vacuum breaker to said laundry machine housing for use during a working cycle, said vacuum breaker housing having an air vent opening for communication with the outside atmosphere, a piston movable within an interior of said vacuum breaker housing between a first position closing said air vent opening and a second position closing said inlet port, said piston being responsive to fluid pressure at said inlet port for moving to said first position, said piston being responsive to a drop in fluid pressure at said inlet port for movement to said second position, a deflector hood supported on said housing outwardly of said vent, and a liquid capture and containment device disposed beneath said hood defining a chamber for capturing and containing liquid particles in a fluid stream discharging from said air vent opening, said liquid capture and containment device including a first annular upstanding sidewall about a perimeter thereof and a second annular upstanding sidewall disposed radially inwardly of said first sidewall, said first and second sidewalls defining a first liquid containment chamber, said second sidewall and an upper side of maid piston defining a second liquid containment chamber when said piston is in said first position, and said chambers both being in fluid communication with the interior of said vacuum breaker housing when said piston is in said second position for draining liquid from said first and second chambers to the interior of said vacuum breaker housing when said piston is moved to said second position.

* * * * *